US009776706B2

(12) United States Patent
Ghapgharan et al.

(10) Patent No.: US 9,776,706 B2
(45) Date of Patent: Oct. 3, 2017

(54) SYSTEM FOR PROTECTING A ROTATABLE SHAFT OF A MOTOR FROM EXCESSIVE BENDING MOMENTS

(71) Applicant: AeroVironment, Inc., Monrovia, CA (US)

(72) Inventors: Emil Ghapgharan, Burbank, CA (US); Lane Dennis Dalan, Simi Valley, CA (US); Pavel Belik, Simi Valley, CA (US); Christopher Eugene Fisher, Thousand Oaks, CA (US); Austin Craig Gunder, Red Lion, PA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 830 days.

(21) Appl. No.: 14/184,599

(22) Filed: Feb. 19, 2014

(65) Prior Publication Data

US 2014/0314565 A1 Oct. 23, 2014

Related U.S. Application Data

(63) Continuation of application No. PCT/US2012/051206, filed on Aug. 16, 2012.

(60) Provisional application No. 61/525,609, filed on Aug. 19, 2011.

(51) Int. Cl.
| *B64C 11/02* | (2006.01) |
| *H02K 7/00* | (2006.01) |
| *H02K 7/14* | (2006.01) |
| *A63H 27/00* | (2006.01) |

(52) U.S. Cl.
CPC ............. *B64C 11/02* (2013.01); *A63H 27/02* (2013.01); *H02K 7/003* (2013.01); *H02K 7/14* (2013.01); *B64C 2201/042* (2013.01); *B64C 2203/00* (2013.01)

(58) Field of Classification Search
CPC ......... A63H 27/02; B64C 11/02; B64C 11/04; B64C 11/08; B64C 11/12
See application file for complete search history.

(56) References Cited

U.S. PATENT DOCUMENTS

| 1,995,447 | A | * | 3/1935 | Daniel | A63H 27/00 |
| | | | | | 446/59 |
| 2,543,516 | A | * | 2/1951 | Walker | A63H 27/00 |
| | | | | | 446/59 |
| 3,482,803 | A | | 12/1969 | Lindenbaum | |
| 3,744,180 | A | * | 7/1973 | Mabuchi | A63H 27/02 |
| | | | | | 192/105 BB |

(Continued)

OTHER PUBLICATIONS

International Search Report for PCT Serial No. PCT/US12/51206 mailed Apr. 26, 2013.

*Primary Examiner* — Woody Lee, Jr.
(74) *Attorney, Agent, or Firm* — Brooks Acordia IP Law, P.C.; Pejman Yedidsion; Christopher Weiss (57) ABSTRACT

A motor assembly that includes a motor having a motor casing, a rotatable shaft extending from said motor casing to a shaft length and a hub coupled to said rotatable shaft, the hub having a circumferential skid surface disposed immediately proximal to the motor casing and having a channel configured to seat a propeller, when a propeller is present, wherein a bending moment applied to the shaft through the hub results in the circumferential skid surface contacting said motor casing.

24 Claims, 7 Drawing Sheets

(56) References Cited

U.S. PATENT DOCUMENTS

| | | | | |
|---|---|---|---|---|
| 3,757,461 A | * | 9/1973 | Chang | A63H 27/02 |
| | | | | 446/58 |
| 3,803,758 A | * | 4/1974 | Chang | A63H 27/02 |
| | | | | 446/58 |
| 3,899,257 A | * | 8/1975 | Gladieux | B64C 11/04 |
| | | | | 403/259 |
| 3,901,627 A | | 8/1975 | Sullivan | |
| 3,940,882 A | * | 3/1976 | Mabuchi | A63H 27/02 |
| | | | | 244/55 |
| 5,525,087 A | * | 6/1996 | Chin-Lin | A63H 27/00 |
| | | | | 446/58 |
| 6,109,985 A | | 8/2000 | Dubois et al. | |
| 6,296,444 B1 | | 10/2001 | Schellhase et al. | |
| 8,430,709 B1 | * | 4/2013 | Wong | A63H 27/12 |
| | | | | 446/34 |
| 9,079,115 B2 | * | 7/2015 | Huang | A63H 27/02 |
| 9,086,099 B2 | * | 7/2015 | Gasser | F16D 3/20 |
| 2007/0212220 A1 | | 9/2007 | Perkinson et al. | |

* cited by examiner

SYSTEM FOR PROTECTING A ROTATABLE SHAFT OF A MOTOR FROM EXCESSIVE BENDING MOMENTS

This application is a continuation of International Patent Application No. PCT/US12/51206, filed Aug. 16, 2012, which claims priority to and the benefit of U.S. Provisional Patent Application Ser. No. 61/525,609 filed Aug. 19, 2011 both of which are hereby incorporated herein by reference in their entirety for all purposes.

TECHNICAL FIELD

The technical field relates to motors, and more particularly to motors that have a propeller to propel an aircraft.

BACKGROUND

Unmanned aerial vehicles (UAVs) may be launched to provide remote observation of a location of interest and to then return to ground for landing and recovery. Some UAVs do not have landing gear, or have landing gear that is not sufficient to clear the propeller during landing. Damage to the aircraft may result, including damage to the propeller and engine compartment should the propeller strike the ground during landing. A need continues to exist to reduce the possibility of damage to the engine compartment resulting from inadvertent propeller strikes during landing.

SUMMARY

A motor apparatus is disclosed that includes a motor having a motor casing, a rotatable shaft extending from the motor casing to a shaft length, and a hub coupled to the rotatable shaft, the hub having a circumferential skid surface disposed immediately proximal to the motor casing. A bending moment applied to the shaft through the hub may result in the circumferential skid surface contacting the motor casing. The apparatus may further comprise a propeller coupled to the hub and seated in the channel so that a bending moment applied to the rotatable shaft from the propeller results in the circumferential skid surface contacting the motor casing. In an exemplary embodiment, the hub may further comprise a cavity to fixedly receive and seat the propeller. In another exemplary embodiment, the hub may comprise a cavity to receive and guide the shaft and the shaft may have a threaded distal portion to threadably attach to a spinner nut to hold the propeller to the cavity. In another exemplary embodiment, the hub may further comprise a shaft cavity to receive the shaft, the shaft cavity extending approximately to the shaft length. In another exemplary embodiment, the circumferential skid surface may be annular, non-annular, or defined by opposing radial hub wings. In another exemplary embodiment, the opposing radial hub wings may each have a thickness of approximately 15 mm. In another exemplary embodiment, the circumferential skid surface may have a thickness of approximately 15 mm thick. In another exemplary embodiment, the skid surface may be spaced apart from the motor casing by approximately 0.5-1.5 mm. In another exemplary embodiment, the hub may be formed from aluminum. In another exemplary embodiment, the outer diameter of the circumferential skid surface may be approximately 20-28 mm.

Another motor apparatus is disclosed that includes a motor having a front skid face, a rotatable shaft extending past the front skid face, a hub coupled to the rotatable shaft, the hub having a circumferential skid surface disposed immediately proximal to the front skid face during at least a portion of a rotation of the rotatable shaft, and a propeller coupled to the hub. A bending moment applied to the shaft through the hub may result in the circumferential skid surface contacting the front skid face during the at least a portion of the rotation. In an exemplary embodiment, the circumferential skid surface may be annular. In another exemplary embodiment, the circumferential skid surface may be defined by opposing radial hub wings. In another exemplary embodiment, the skid surface may be spaced apart from the front skid face by approximately 0.5-1.5 mm when the circumferential skid surface is rotated to a position in complementary opposition to the front skid face.

A method of protecting a rotatable shaft of a motor from excessive bending moments is disclosed that includes applying a bending moment to a propeller, such as from a ground strike of the propeller, transmitting the bending moment through the propeller to a hub, transmitting the bending moment from the hub to a rotatable shaft of a motor, and limiting bending deformation of the rotatable shaft with reinforcing contact between a motor casing and a circumferential skid surface of the hub. The possibility of damage to an engine compartment during landing may be reduced by reinforcing contact between the motor casing and circumferential skid surface of the hub, if the propeller experiences a ground strike.

A motor apparatus is disclosed that has a hub coupled to a rotatable shaft, the hub having a circumferential skid surface disposed about a hub perimeter, and a motor rotatably coupled to the hub through the rotatable shaft, the motor having means for providing reinforcing contact spaced immediately apart from and in complementary opposition to the circumferential skid surface of the hub, wherein a bending moment applied to the shaft results in the circumferential skid surface of the hub contacting the means for providing reinforcing contact. In one embodiment, the apparatus may also include means for seating a propeller onto the shaft, the means for seating configured so that a bending moment applied to the propeller is transmitted to the hub through the shaft and resulting in the circumferential skid surface contacting means for providing reinforcing contact. In one embodiment, the circumferential skid surface is annular. In such a case, an outer diameter of the circumferential skid surface may be approximately 20-28 mm, or, the circumferential skid surface is non-annular. If non-annular, the circumferential skid surface may be defined by opposing radial hub wings. In another embodiment, the circumferential skid surface is spaced apart from the means for providing reinforcing contact by approximately 0.5-1.5 mm when the circumferential skid surface is rotated to a position in complementary opposition to the front skid face.

BRIEF DESCRIPTION OF THE DRAWINGS

Embodiments of the invention are illustrated by way of example and not limitation in the figures of the accompanying drawings, and in which.

DETAILED DESCRIPTION

A system is disclosed for reducing the possibility of damage to an engine compartment due to a propeller strike during landing. In one embodiment of a method to protect a rotatable shaft of a motor from excessive bending moments, a bending moment may be transmitted from the propeller to a hub, and may then be further transmitted to the rotatable shaft. Bending deformation of the rotatable shaft may be limited by reinforcing contact made between a circumferential skid surface of the hub and a motor casing of the motor.

Figure 1:
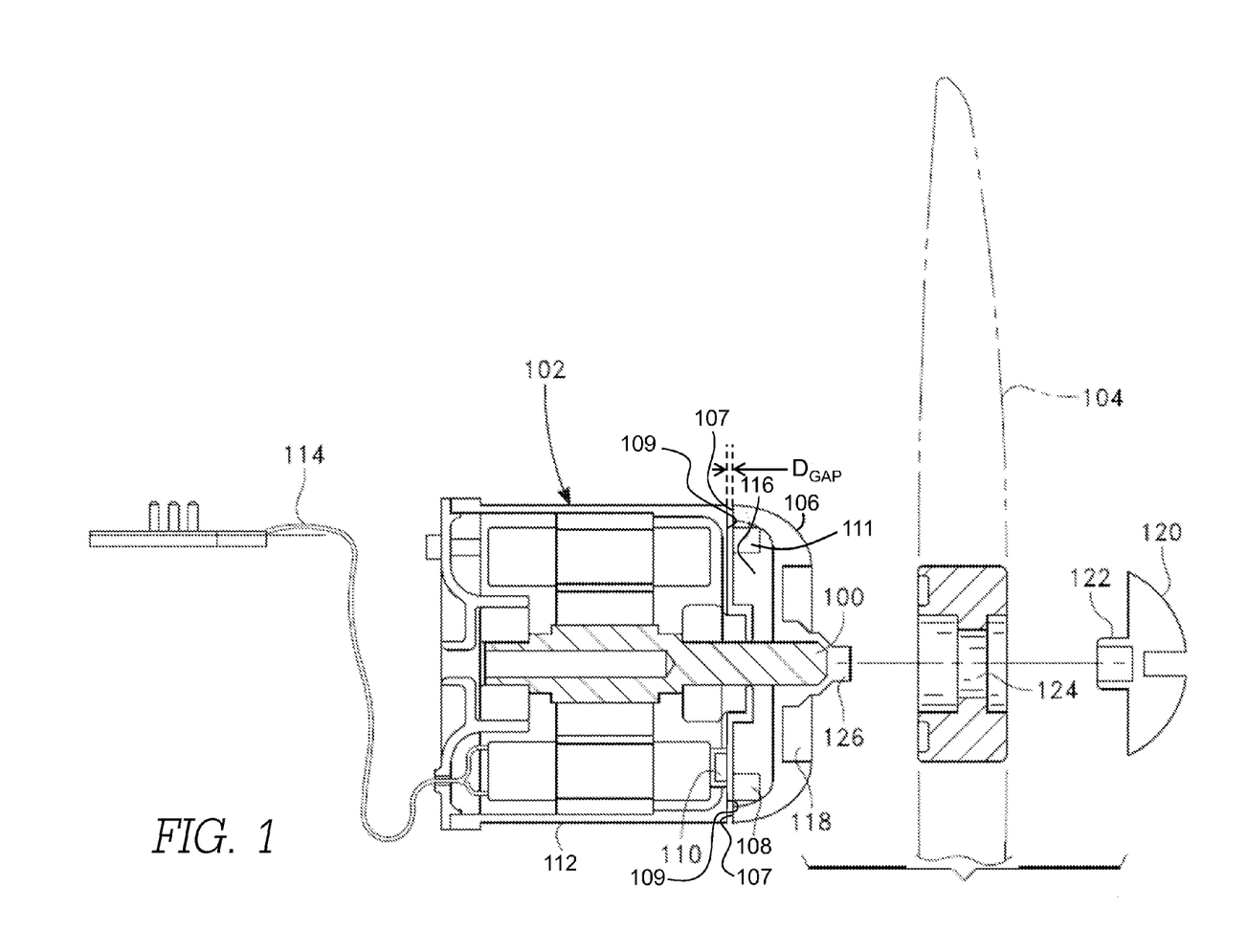
FIG. 1 is a cross-sectional view of one embodiment of a hub having a circumferential skid surface disposed immediately proximal to the motor casing of a motor.

FIG. 1 is a cross-sectional view of a motor assembly that has, in one embodiment, a hub coupled to a rotatable shaft extending from a motor, the hub having a circumferential skid surface disposed immediately proximal to a motor casing of the motor so that a bending moment applied to the shaft through the hub results in the circumferential skid surface contacting the motor casing. A shaft 100 of the motor 102 may drive the propeller 104 through a hub 106 that is depicted as coupled to the shaft 100. The motor 102 may be a permanent three-phase electric motor, or may be a DC motor or other motor that may be operable to drive the propeller 104 through the rotatable shaft 100. The hub has a skid surface, in one embodiment a circumferential skid surface 107, disposed immediately proximal to a motor casing 112 of the motor 102 when assembled to the rotatable shaft. Although described as circumferential, the circumferential skid surface 107 need not be continuous, but may be formed with a dis-contiguous surface about a hub perimeter, or as a surface extending without a surface break. The circumferential skid surface may be formed of the same material and surfacing as the remainder of the hub 106, such as aluminum 7075-T6 that is anodized per MIL-A-8625, Type II, Class 2. Additionally, the circumferential surface may be formed with a different material and/or surface treatment. For example, the circumferential skid surface may be smoothed or roughened to reduce or reinforce, respectively, rotatable shaft deceleration resulting from reinforcing contact between the motor casing and the circumferential skid surface.

In a preferred embodiment, the circumferential skid surface 107 may be disposed immediately proximal to a front skid face 109 of the motor casing 112 and spaced apart from the front skid face 109 by a gap distance ($D_{GAP}$). In one embodiment having a shaft 100 outer diameter of 4.76 mm and a composition of 17-4 PH stainless steel, the gap distance ($D_{GAP}$) may be approximately 0.51 mm. In alternative embodiments the gap distance may be 0.5 mm-1.5 mm. The gap distance ($D_{GAP}$) is predetermined to enable impact of the circumferential skid surface 107 onto the front skid face 109 prior to reaching the load limit of the shaft 100 so that the shaft 100 is protected from excessive bending moments. The impact of the circumferential skid surface 107 on the front skid face 109 may serve to limit bending of the shaft 100 in the face of a potentially excessive shaft deflection due to, for example, a propeller strike. The gap distance ($D_{GAP}$) may be limited at a maximum design distance by the yield load on the shaft and at a minimum by the stacked manufacturing tolerances of the hub, shaft, engine mounts, and other components (i.e., "motor assembly") that affect positioning of the circumferential skid surface 107 with respect to the front skid face 109 of the motor casing 112. For example, more exact manufacturing tolerances of the motor assembly may allow the designed gap distance ($D_{GAP}$) to be reduced in view of a given shaft's dimensions, support, and material, since manufacturing deviations may be less likely to cause inadvertent impact of the hub against motor casing during normal operation. If stacked manufacturing tolerances of the motor assembly are greater for the given shaft's dimensions, support and material, the gap distance ($D_{GAP}$) may be increased to prevent known manufacturing variations from causing inadvertent impact of the circumferential skid surface 107 and front skid face 109 after assembly and during operation. Further, the gap distance ($D_{GAP}$) may be sized to allow both dirt and water to easily and quickly exit the space between the hub and the motor. In an alternative embodiment, the motor is provided with the front skid face 109 positioned immediately proximal to the circumferential skid surface of the hub, when the hub is assembled on the rotatable shaft, during at least a portion of a rotation of the rotatable shaft.

A sensor trigger, e.g., a magnet 108, may be coupled to the hub 106 at an outer diameter of the hub and facing the motor. As the shaft 100 drives the hub 106, the magnet 108 rotates with the shaft 100. Additionally, the sensor trigger may be mounted on or in the propeller 104. A second magnet 111 may be coupled to the hub 106 on a side of the hub opposite from the magnet to weightably balance the hub 106. A sensor 110 is coupled to the interior of the motor casing 112 to protect the sensor from the external environment (such as dust, rain and other contaminants), with the sensor 110 fixed at a location that is complementary to the magnet 108 to facilitate detection of the magnet 108 as it is rotated with the hub 106 past the sensor 110. The sensor 110 may be triggered by a Hall Effect sensor. In embodiments where the sensor trigger is mounted on or in the propeller 104, the sensor 110 may be located in the motor casing 112 or on an exterior surface of the motor casing 112. The sensor may be in communication with a motor controller through a motor cable 114 to provide feedback for propeller angular position location. In embodiments where the motor 102 is a permanent three-phase motor, each of the phase circuits of the motor may be selectively controllable to control rotation of the propeller 104 through the shaft 100.

The hub 106 is illustrated as having a tapered exterior cross section with an interior cavity 116 to reduce its mass from what would otherwise be a solid component. The propeller 104 is depicted as seated in an indexer, e.g., a channel 118 sized to fit the width of the propeller, and located on an exterior surface of the hub that is on a side opposite from the motor 102. The angular orientation of the indexer with respect to the sensor trigger 108 is predetermined to facilitate proper angular alignment of the propeller 104 versus the sensor 110, as will be described more fully below. The propeller may be seated and held in the channel 118 by a spinner nut 120. The spinner nut 120 has a spinner nut post 122 that is inserted through a center channel 124 of the propeller 102 to threadably engage a hub post 126. The spinner nut 120 may accordingly press and hold the propeller 104 against the surface of the hub 106 to enable the shaft 100 to drive the hub 106 that then drives the seated propeller 104. Because the propeller 104 is pressed and held against the surface of the hub 106, application of a bending moment to the propeller (such as during a propeller ground strike) results in transmission of the bending moment through the propeller to the hub. The hub then transmits the bending moment to the rotatable shaft. Because the circumferential skid surface 107 is disposed immediately proximal to a motor casing 112 of the motor, bending deformation of the rotatable shaft 100 is limited with reinforcing contact between the motor casing 112 and the circumferential skid surface 107 of the hub 106.

Figure 2:
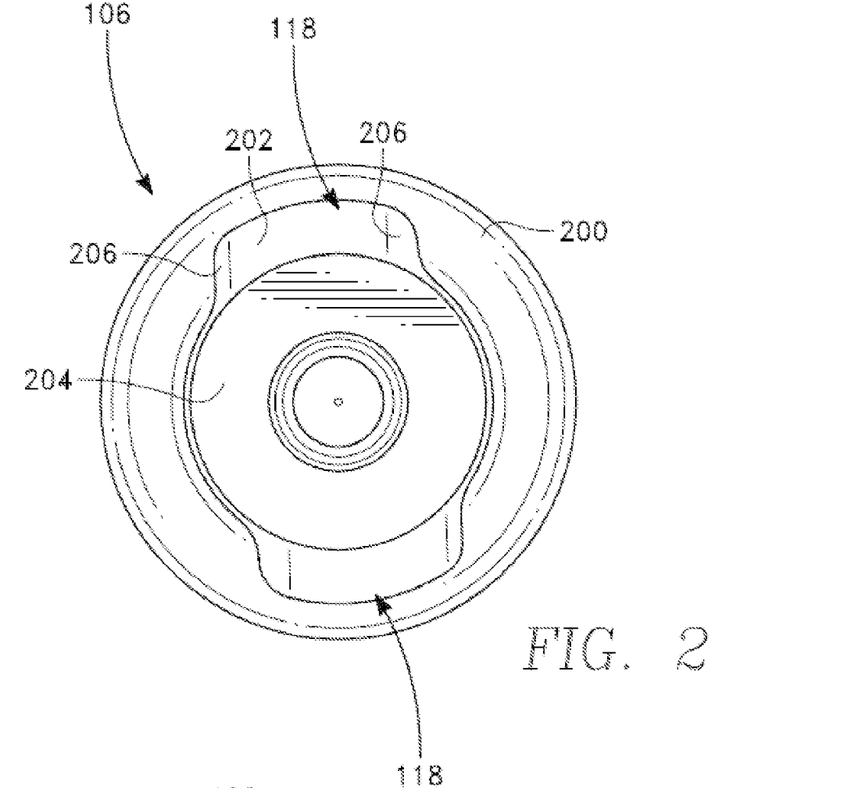
FIGS. 2, 3, and 4 are respectively a top, perspective, and rear view of the hub and circumferential skid surface illustrated in FIG. 1.
Figure 3:
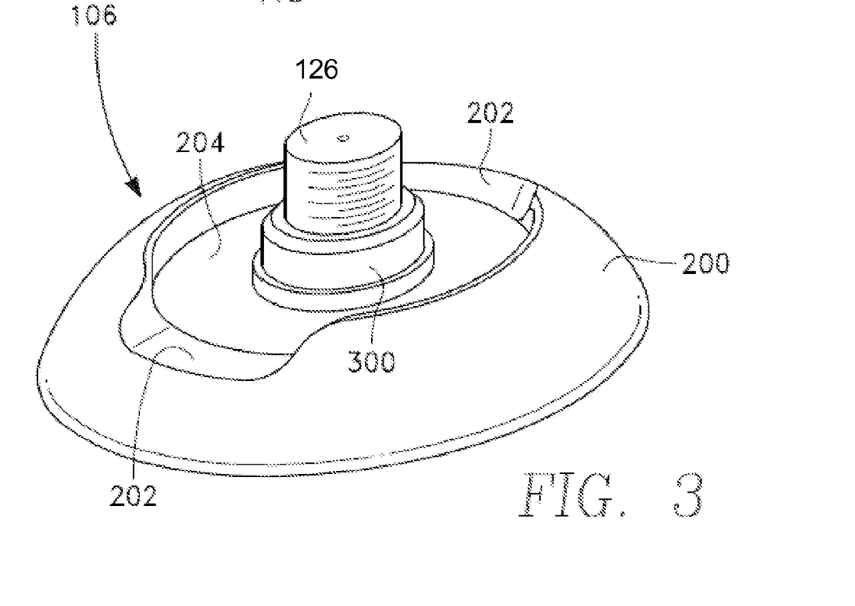
Figure 4:
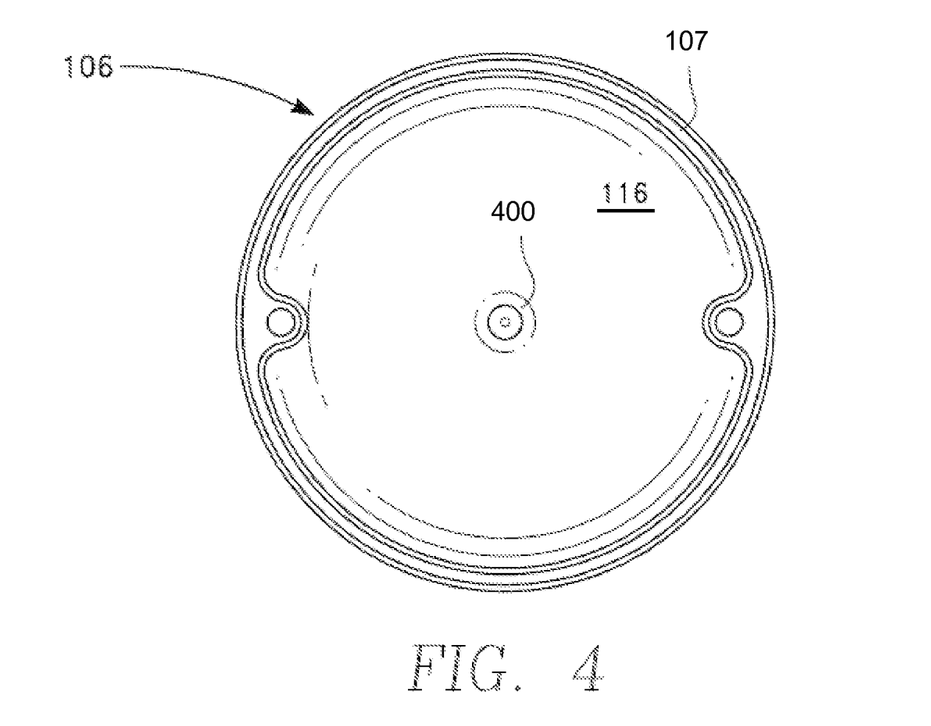

FIGS. 2, 3, and 4 are, respectively, top, perspective, and rear views of the hub 106 and channel illustrated in FIG. 1. The channel 118 may be formed through a lip portion 200 of the hub 106 that may be conical, sloped or have an angular transition between front and back sides of the hub 106 to direct air away from a center section of the propeller and motor to increase efficiency of the propeller. The bottom surface 202 of the channel 118 is depicted as extending to a hub platform 204 to collectively seat a propeller 104 for transmission of a bending moment through the propeller (see FIG. 1) to the hub 106 and from the hub 106 to the rotatable shaft (see FIG. 1). Although the bottom surface 202 of the channel 118 is illustrated as having a bottom surface 202 and side wall portions 206 that are each contoured to approximate the bottom surface of the airfoil of a utilized propeller (not shown), in an alternative embodiment, the bottom surface 202 may be flat and the sloped sidewall portions 206 may be perpendicular to the flat bottom surface 202 or at an angle to the bottom surface 202 to receive and guide a propeller as the hub 106 is driven by the shaft (see FIG. 1). In embodiments that have a flat bottom surface 202, the hub platform 204 may more completely seat the propeller or the sidewall portions 206 may be positioned to have a more prominent role in receiving and guiding the propeller as the hub 106 is driven by the shaft (see FIG. 1). The hub post 126 is depicted as extending away from the hub platform 204 to threadably engage a spinner nut post through a center channel of a propeller (see FIG. 1) to couple the propeller to the hub 106. A hub post mating surface 300 slidably receives the center channel of the propeller. Although illustrated as threaded, the hub post 126 may be formed without threads to accomplish a press-fit, an adhesive coupling, or other coupling, of the propeller to the hub 106 with or without the use of a spinner nut 120 or its equivalent. A portion of the interior cavity 116 may include a shaft cavity extending into the rear center of the hub to fixedly receive the shaft with a press fit, a threadable coupling or with an adhesive.

In FIG. 4, a circumferential skid plate 107 of the hub 106 may be annular and continuous about a perimeter of the hub 106. In an alternative embodiment, the circumferential skid plate 107 may be formed with a dis-contiguous surface about a hub perimeter, or as a surface extending without a surface break. The interior cavity 116 of the hub 106 is provided to reduce the weight of the hub from what would otherwise be that of a solid structure. A shaft slot 400 is provided at the center axis of the hub 106 to receive the shaft of the motor, via, for example a press-fit.

Figure 5:
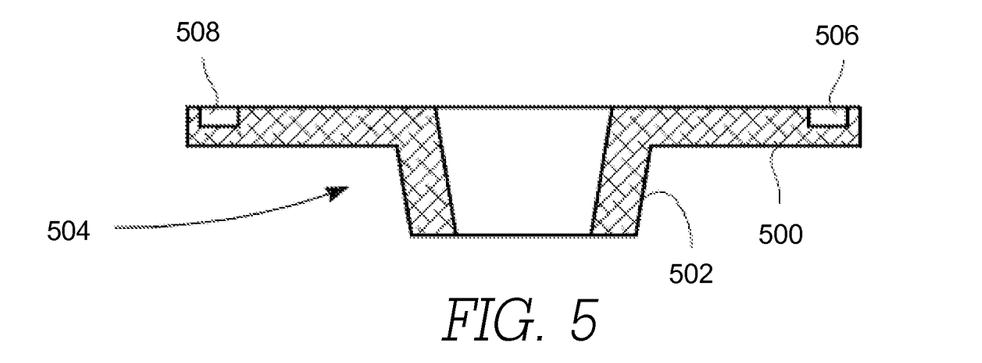
FIGS. 5, 6, and 7 are cross-sectional, back plan and perspective views, respectively, of one embodiment of a hub having a circumferential skid surface.
Figure 6:
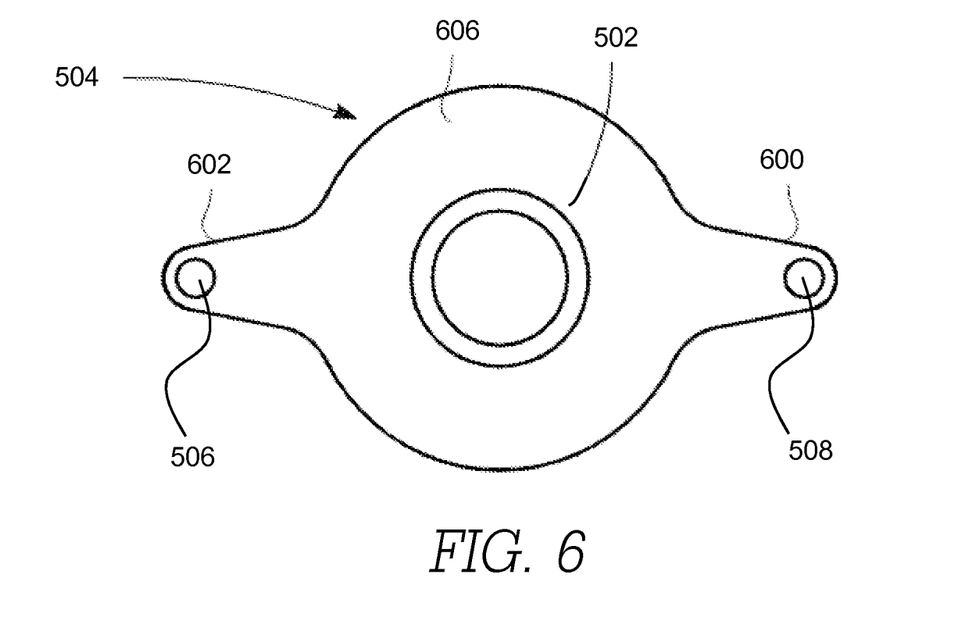
Figure 7:
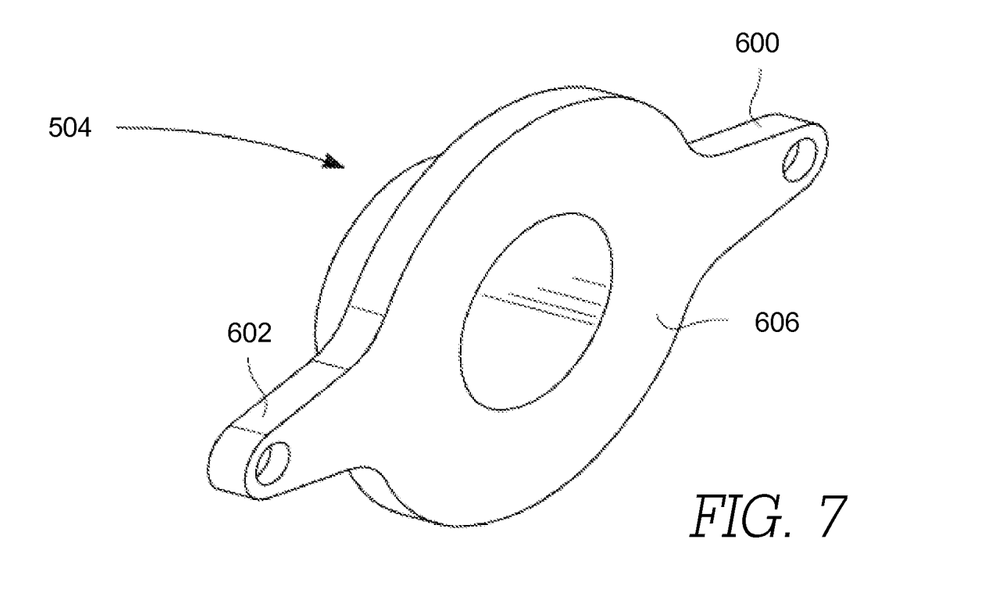

FIGS. 5, 6, and 7 are, respectively, cross-sectional, back plan, and perspective views of one embodiment of a hub having a circumferential skid plate to enable reinforcing contact between the hub and a motor casing during a propeller strike to reduce the possibility of damage to an engine compartment. In the illustrated embodiment, indexer wings (600, 602) extend out from a main body of the hub 504 to receive the propeller. A back surface of the hub and associated indexer wings defines a non-annular circumferential skid surface 606 in the form of opposing radial hub wings. During aircraft assembly, the propeller may be aligned to seat on the indexer wings (600, 602) to ensure a supportive coupling to the hub and to ensure a known alignment of the propeller with first and second trigger cavities (506, 508) formed in the hub. The coupling of the propeller to seat on the base 500, indexer wings (600, 602) and adjacent sidewalls 502 enables transmission of a bending moment received through the propeller, through the hub and to the rotatable shaft of the motor. The hub 504 may then be coupled to a shaft (not shown). In one embodiment, first and second magnets may be seated in respective first and second trigger cavities (506, 508). In one embodiment of a hub formed of aluminum 7075-T6 and anodized per MIL-A-8625, Type II, Class II, each indexer wing (600, 602) may have a thickness of approximately 15 mm. An outer diameter of the circumferential skid surface 606 may be approximately 20-28 mm. During operation, the circumferential skid surface 606 may contact the front skid face of the motor during at least a portion of the rotation travel path of the propeller if the propeller experiences a ground strike that transmits a bending moment to the rotational shaft to protect the rotational shaft from excessive and potentially damaging (to the shaft and motor) elastic deformation.

In one alternative embodiment, the hub may be omitted and the propeller may be seated on the motor shaft. The propeller may be coupled to the motor shaft at a location immediately proximal to the front skid face of the motor, with the propeller itself having a skid surface. During operation, the propeller skid surface may contact the front skid face of the motor if the propeller experiences a ground strike that transmits a bending moment to the rotational shaft to protect the rotational shaft from excessive and potentially damaging (to the shaft and motor) elastic deformation.

Figure 8:
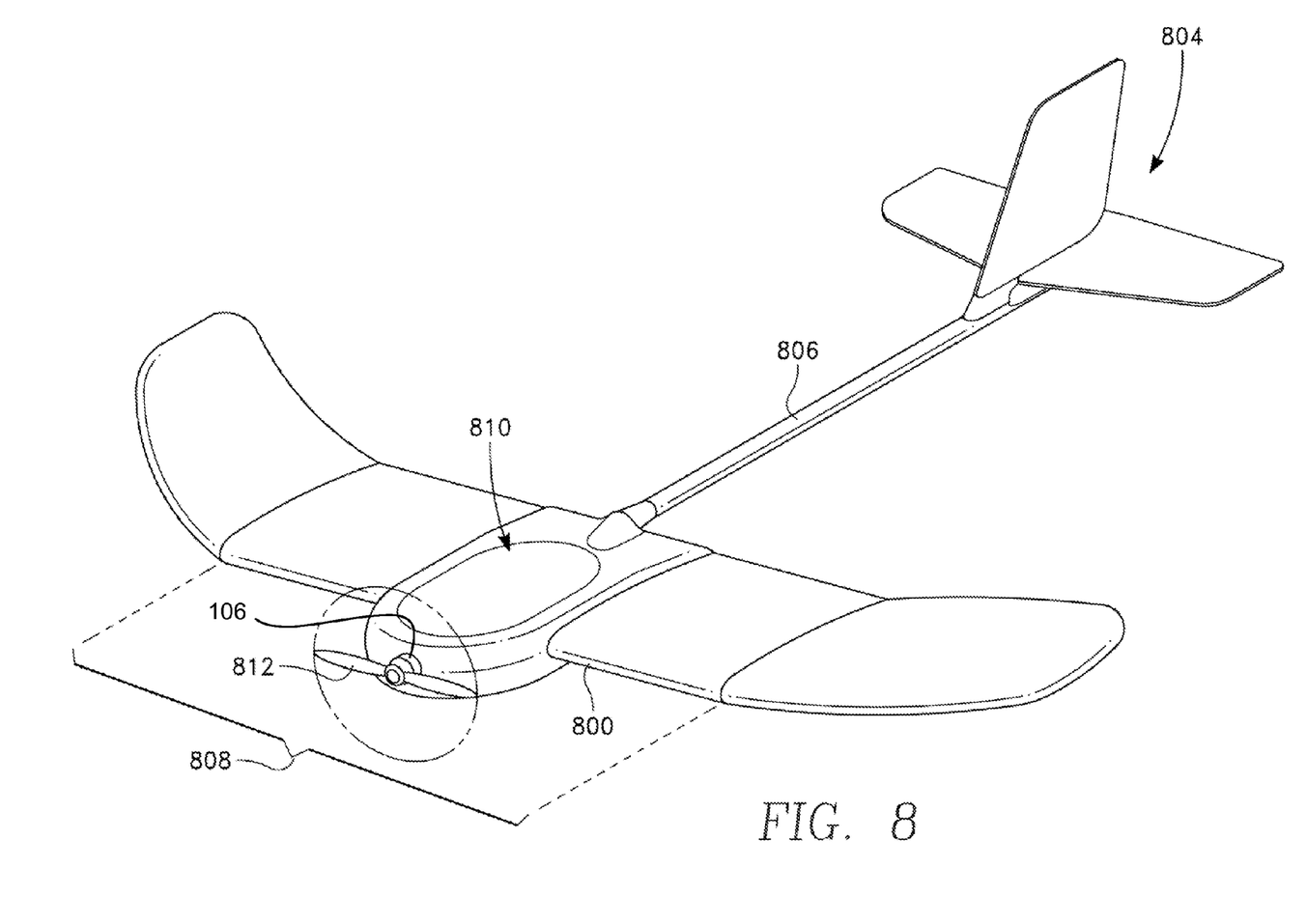
FIG. 8 is one embodiment of an aircraft system for use with the hub, rotatable shaft and motor assembly first illustrated in FIG. 1.

FIG. 8 is a perspective view of one embodiment of an aircraft for use with the motor assembly first illustrated in FIG. 1. The aircraft has a wing 800 coupled to a tail assembly 804 through a fuselage boom 806. A center section 808 of the wing 800 has a motor assembly 810 that includes a propeller 812 coupled to a motor through a shaft (not shown), with the hub 106 having a circumferential skid plate. In an alternative embodiment, the tail assembly may be omitted and a canard configuration may be provided in front of the wing 800. The motor assembly 810 illustrated as a puller-prop would be reconfigured as a pusher-prop positioned aft of the wing 800.

Figure 9:
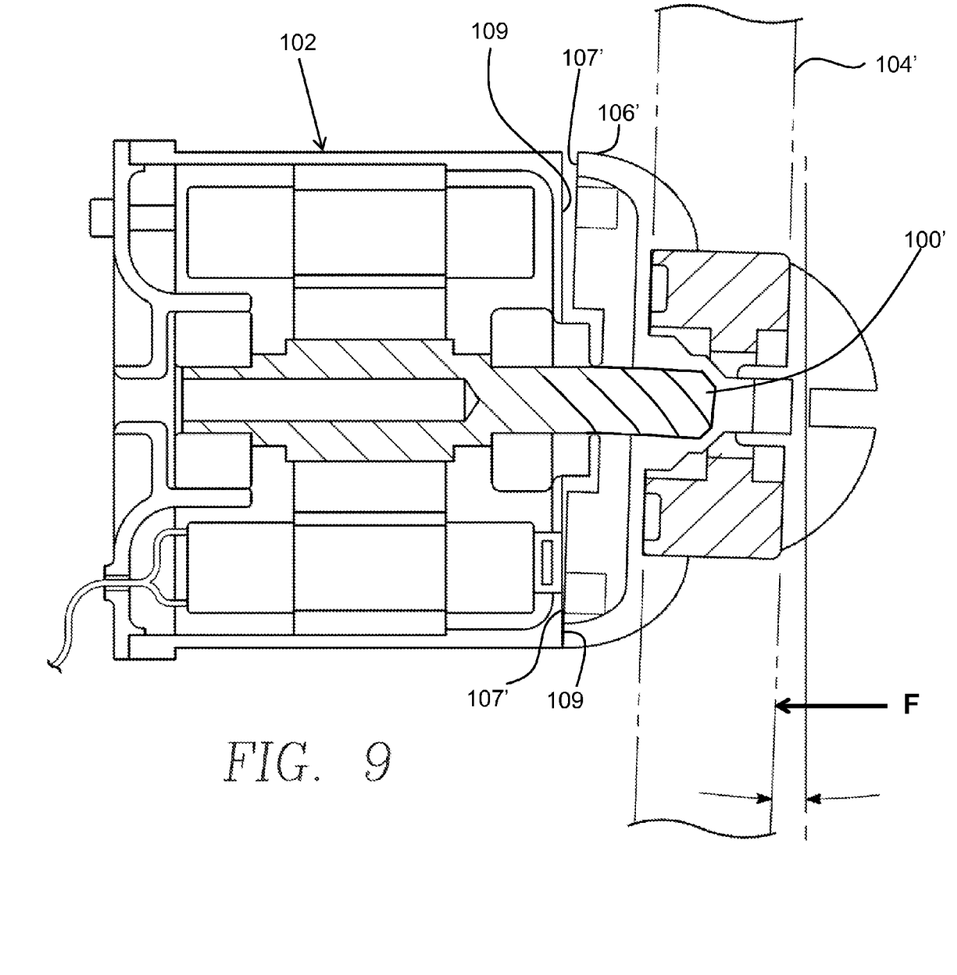
FIG. 9 is a cross-sectional view of the hub and circumferential skid surface illustrated in FIG. 1, with a bending moment applied to the shaft by the propeller through the hub.

FIG. 9 illustrates the circumferential skid surface illustrated in FIG. 1, with a bending moment applied to the shaft through the hub in response to a force (F) on the propeller. The hub 106 is coupled to a rotatable shaft 100' extending from a motor 102, the hub 106' having the circumferential skid surface 107' disposed immediately proximal to the front skid face 109. As illustrated by FIG. 9, a force (F) applied to the propeller 104' is transmitted through the hub 106' to the shaft 100'. The circumferential skid surface 107' may impact on the front skid face 109 if such force (F) becomes excessive, thus protecting the shaft 100' from excessive deflections.

Figure 10:
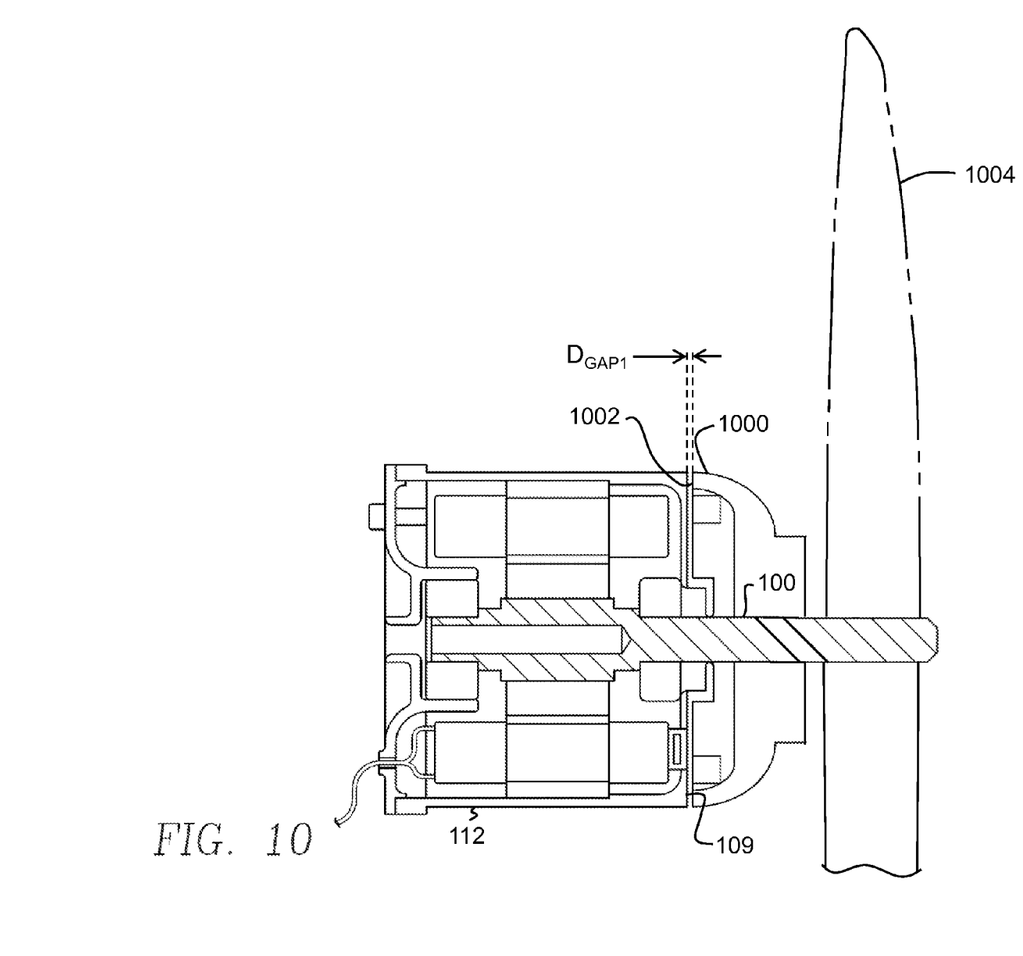
FIG. 10 is a cross-sectional view of an alternative embodiment of a hub having a circumferential skid surface, with the propeller attached the shaft separately from the hub.

FIG. 10 illustrates an alternative embodiment of a hub having a circumferential skid surface, with the propeller attached to the shaft separately from the hub. In this embodiment, a hub 1000 is coupled to the shaft, such as with a friction fit. The hub has a circumferential skid surface 1002 spaced immediately apart from and in complementary opposition to the front skid face 109 of the motor casing 112 and spaced apart from the front skid face 109 by a gap distance ($D_{GAP1}$). Although described as circumferential, the circumferential skid surface 1002 need not be continuous, but may be formed with a dis-contiguous surface about a hub perimeter, or as a surface extending without a surface break. The circumferential skid surface may be formed of the same material and surfacing as the remainder of the hub 1000, such as aluminum 7075-T6 that is anodized per MIL-A-8625, Type II, Class 2. Additionally, the circumferential surface may be formed with a different material and/or surface treatment. For example, the circumferential skid surface may be smoothed or roughened to reduce or reinforce, respectively, rotatable shaft deceleration resulting from reinforcing contact between the motor casing and the circumferential skid surface. The propeller 1004 may be coupled to the shaft in series with the hub 1000, such as with a friction fit or other coupling. The gap distance ($D_{GAP}$) may be predetermined to enable impact of the circumferential skid surface 107 onto the front skid face 109 prior to reaching the load limit of the shaft 100 so that the shaft 100 is protected from excessive bending moments. The impact of the circumferential skid surface 107 on the front skid face 109 may serve to limit bending of the shaft 100 in the face of a potentially excessive shaft deflection due to, for example, a propeller strike. The gap distance ($D_{GAP1}$) is limited at a maximum design distance by the yield load on the shaft 100 and at a minimum by the stacked manufacturing tolerances of the hub, shaft, engine mounts, and other components (i.e., "motor assembly") that affect the positioning of the circumferential skid surface 1002 with respect to the front skid face 109 of the motor casing 112.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A motor apparatus, comprising:
   a motor having a motor casing;
   a rotatable shaft extending from said motor casing to a shaft length; and
   a rotatable hub coupled to said rotatable shaft, said rotatable hub having a circumferential skid surface disposed immediately proximal to said motor casing and having a channel configured to seat a propeller;
   wherein a bending moment applied to said shaft through said hub results in a bending of said shaft such that said circumferential skid surface contacts said motor casing during at least a portion of a rotation of said rotatable shaft.

2. The apparatus of claim 1, further comprising:
   a propeller coupled to said hub and seated in said channel so that a bending moment applied to said propeller is transmitted to said rotatable shaft through said hub and resulting in said circumferential skid surface contacting said motor casing.

3. The apparatus of claim 2, wherein said hub further comprising a shaft cavity to fixedly receive and seat said propeller.

4. The apparatus of claim 2, wherein said hub comprises a cavity configured to receive said shaft and wherein said shaft has a threaded distal portion configured to threadably receive a spinner nut to hold the propeller to said hub.

5. The apparatus of claim 1, wherein said channel is contoured to approximate the bottom surface of an airfoil.

6. The apparatus of claim 1, wherein said hub further comprises:
   a shaft cavity to receive said shaft, said shaft cavity extending approximately to said shaft length so that said circumferential skid surface is disposed immediately proximal to said motor casing.

7. The apparatus of claim 1, wherein said circumferential skid surface is annular.

8. The apparatus of claim 1, wherein said circumferential skid surface is non-annular.

9. The apparatus of claim 1, wherein said circumferential skid surface comprises opposing radial hub wings.

10. The apparatus of claim 1, wherein said skid surface is spaced apart from said motor casing by approximately 0.5-1.5 mm.

11. The apparatus of claim 1, wherein said hub is formed from aluminum.

12. The apparatus of claim 1, wherein an outer diameter of said circumferential skid surface is approximately 20-28 mm.

13. A motor apparatus, comprising:
    a motor having a front skid face;
    a rotatable shaft extending past said front skid face;
    a rotatable hub coupled to said rotatable shaft, said hub having a circumferential skid surface disposed immediately proximal to said front skid face during at least a portion of a rotation of said rotatable shaft; and a propeller seated on said hub;
    wherein a bending moment applied to said shaft through said hub results in a bending of said shaft such that said circumferential skid surface contacts said front skid face during said at least a portion of said rotation.

14. The motor apparatus of claim 13, wherein said circumferential skid surface is annular.

15. The apparatus of claim 13, wherein said circumferential skid surface is defined by opposing radial hub wings.

16. The apparatus of claim 13, wherein said skid surface is spaced apart from said front skid face by approximately 0.5-1.5 mm when said circumferential skid surface is rotated to a position in complementary opposition to said front skid face.

17. A method of protecting a rotatable shaft of a motor from excessive bending moments, the method comprising:
    applying a bending moment to a propeller;
    transmitting said bending moment through said propeller to a rotatable hub;
    transmitting said bending moment from said rotatable hub to a rotatable shaft of a motor; and limiting bending deformation of the rotatable shaft with reinforcing contact between a motor casing and a circumferential skid surface of said rotatable hub as said rotatable shaft bends;
    wherein the possibility of damage to an engine compartment by a propeller ground strike is reduced by reinforcing contact between the motor casing and circumferential skid surface of the hub during at least a portion of a rotation of said rotatable shaft.

18. A motor apparatus, comprising:
    a rotatable hub coupled to a rotatable shaft, said rotatable hub having a circumferential skid surface disposed about a hub perimeter; and a motor coupled to said rotatable hub through said rotatable shaft, said motor having a front skid face for providing reinforcing contact spaced immediately apart from and in complementary opposition to the circumferential skid surface of the hub;

wherein a bending moment applied to said shaft results in a bending of said shaft such that said circumferential skid surface of said hub contacts said front skid face for providing reinforcing contact during at least a portion of a rotation of said rotatable shaft.

19. The apparatus of claim 18, further comprising:

a channel for seating a propeller onto said shaft, said channel for seating configured so that a bending moment applied to said propeller is transmitted to said hub through said shaft and resulting in said circumferential skid surface contacting said front skid face for providing reinforcing contact.

20. The apparatus of claim 18, wherein said circumferential skid surface is annular.

21. The apparatus of claim 20, wherein an outer diameter of said circumferential skid surface is approximately 20-28 mm.

22. The apparatus of claim 18, wherein said circumferential skid surface is non-annular.

23. The apparatus of claim 22, wherein said circumferential skid surface is defined by opposing radial hub wings.

24. The apparatus of claim 18, wherein said circumferential skid surface is spaced apart from said front skid face for providing reinforcing contact by approximately 0.5-1.5 mm when said circumferential skid surface is rotated to a position in complementary opposition to said front skid face.

\* \* \* \* \*